Patented Mar. 12, 1946

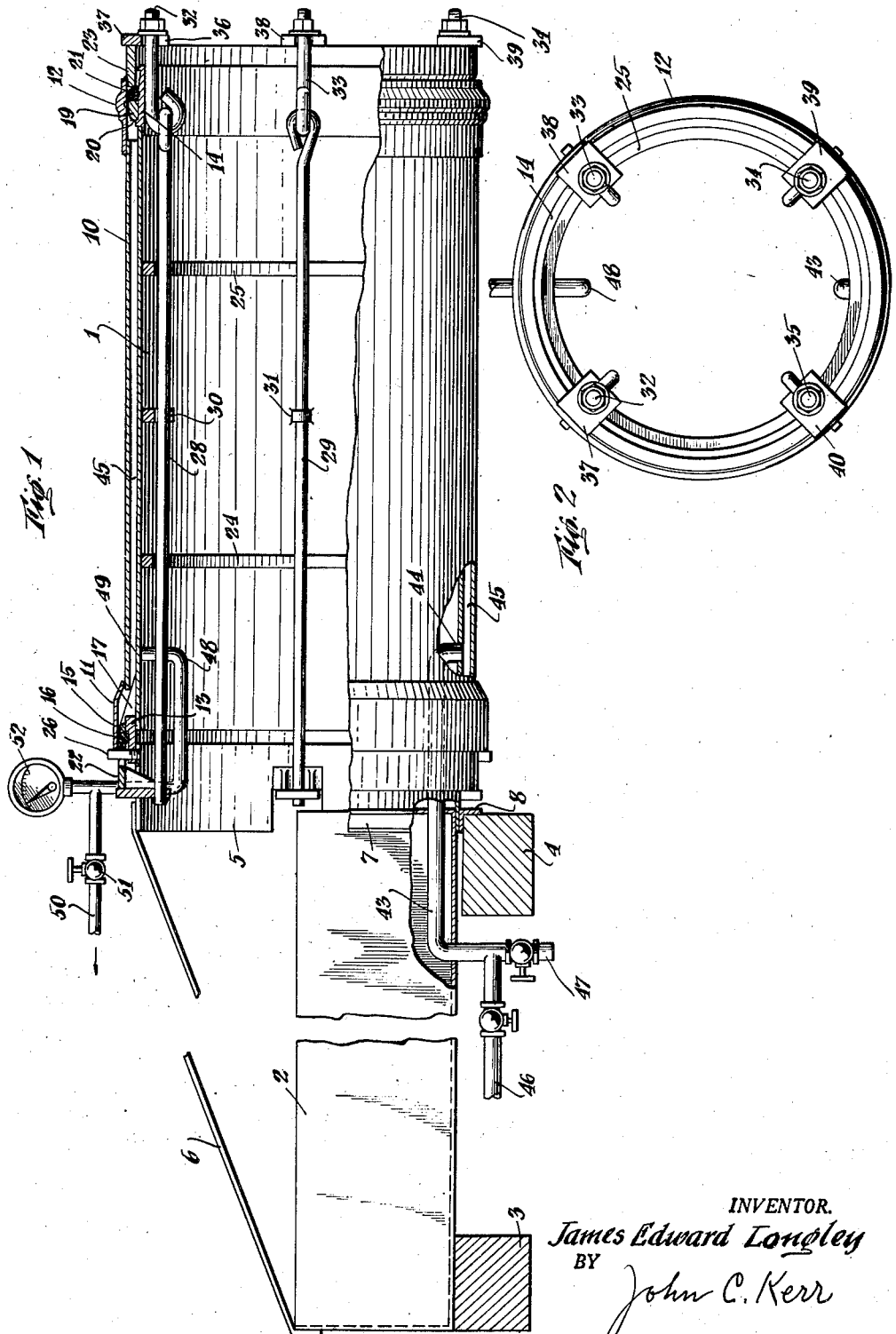

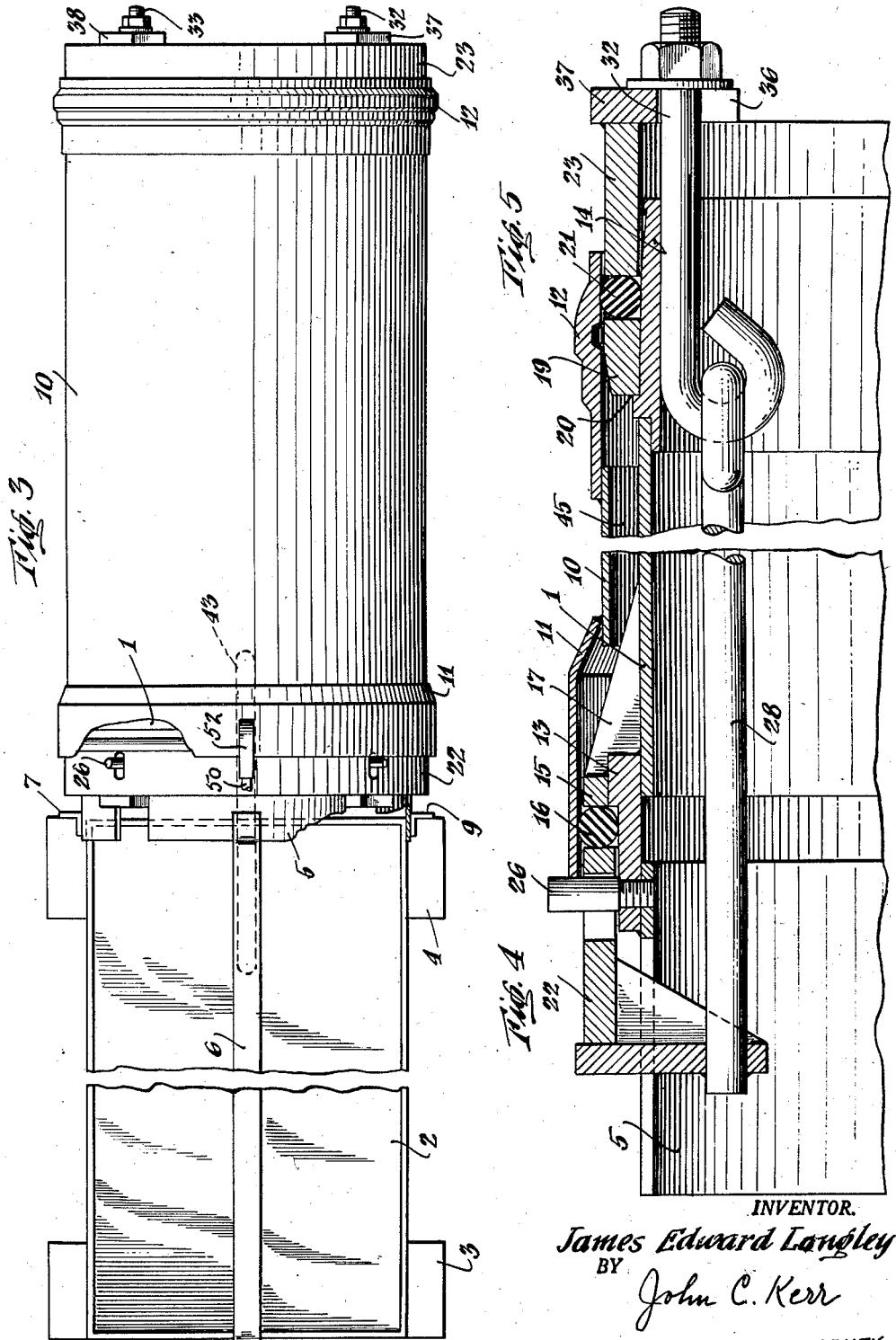

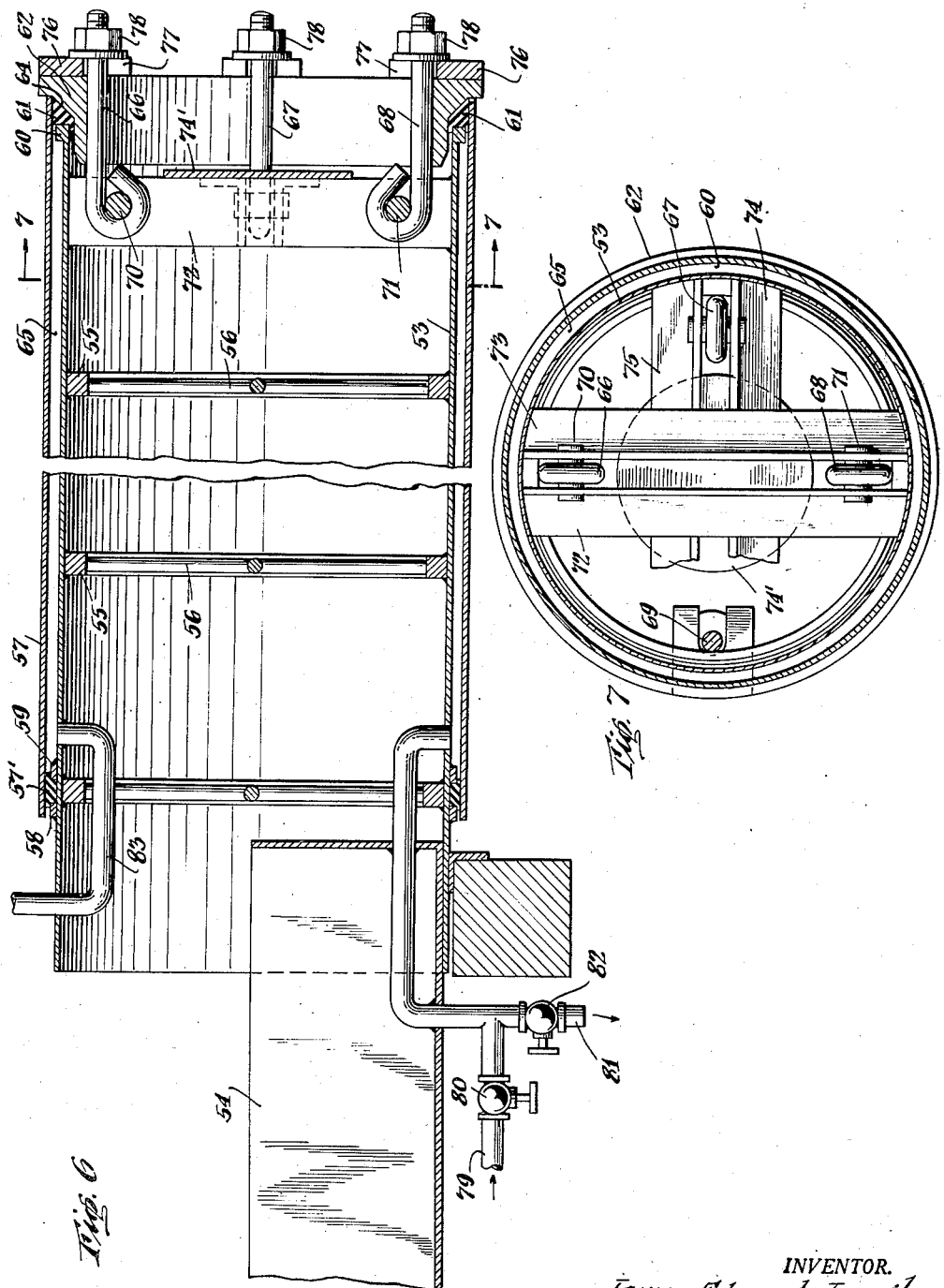

2,396,380

UNITED STATES PATENT OFFICE 2,396,380

APPARATUS FOR TESTING CYLINDERS

James Edward Longley, Verona, N. J., assignor to Lock Joint Pipe Company, East Orange, N. J., a corporation of New Jersey Application January 24, 1945, Serial No. 574,407

4 Claims. (Cl. 73—37)

This invention relates to apparatus for testing cylinders, pipes and tubes and other open-ended sleeve-like structures. Among the objects of the invention is to provide a relatively inexpensive testing apparatus which is simple in construction and economical to operate.

Another object of the invention is to provide a cylinder testing apparatus requiring but small amounts of compressed fluid and with which a cylinder can be quickly tested.

Another object of the invention is to provide a relatively light structure for restraining the pressure at the ends of the cylinder being tested. To this end the apparatus employs annular gaskets to seal an enclosed annular space immediately within the cylinder being tested.

Further and other objects of the invention will appear hereinafter from the following description in which the principle of the invention and the best mode in which I have contemplated applying the same is disclosed.

Referring to the drawings:

Fig. 1 is a side view of a cylinder testing apparatus, partly in section;

Fig. 2 is an end elevation of the apparatus shown in Fig. 1;

Fig. 3 is a plan of the apparatus shown in Fig. 1;

Fig. 4 is an enlarged section of the sealing arrangement at the supported end of the testing apparatus shown in Fig. 1;

Fig. 5 is an enlarged section of the sealing arrangement at the free end of the apparatus shown in Fig. 1;

Fig. 6 is a vertical section through a modified form of apparatus;

Fig. 7 is a section on line 7—7 of the apparatus illustrated in Fig. 6, showing parts broken away.

The apparatus includes a tubular member 1 which is preferably of the same sectional configuration as the section of the cylinder or other tubular device which is to be tested. Its cross-sectional area with respect to the internal area of the cylinder to be tested is only sufficiently less to permit mounting the cylinder outside of the tubular member and leave sufficient clearance between the two to permit the introduction of water, air or other fluid.

The tubular member serves as part of a core upon which the cylinder to be tested is mounted. This core is supported at one end by a frame structure including a box 2 which rests upon sills 3 and 4. The frame structure also includes a ring 5, a brace 6 fastened to one end of box 2 and to ring 5 and other structural members 7, 8 and 9 by which the core is secured to the box. The core overhangs and extends beyond the frame member which is suitably weighted by material, such as concrete, scrap iron, etc., which is carried in the box. The frame member and contents support the core clear of the ground.

The apparatus is intended for determining whether or not there are any leaks in cylinders, pipes, tubes or other sleeve-like structures. In Fig. 1 I have shown a cylinder 10 of a form which is commonly employed in the construction of concrete pipes. This sleeve consists of a rolled sheet of plate steel which has its ends abutting and forming a longitudinal seam. This seam is welded. The ends of the cylinder include joint rings 11 and 12 which are respectively welded to the sleeve throughout their circumferences. While the form of the apparatus shown in Fig. 1 is such as to support a pipe cylinder of a given construction, it will be apparent that any form of tubular construction may be tested with the apparatus of this invention, including one-piece tubes of uniform wall thickness throughout their lengths.

The core includes tubular member 1 and end rings 13 and 14 which telescopingly engage the tubular member and are welded thereto entirely around their circumferences. End ring 13 is supported from ring 5 and carries a ring 15 which is attached to the end ring and serves as an abutment for gasket 16 which encircles the end ring. A plurality of sloping pieces 17 uniformly distributed about the circumference of the core serve as ramps to guide the inner end of the cylinder 10 over ring 15 when the cylinder is being mounted upon the apparatus.

The free end of the core supports a removable ring 19 which bears against a shoulder 20 on the end ring 14 when the apparatus is assembled for testing. Ring 19 serves as a wall against which gasket 21 is compressed during a testing operation. A pair of gland rings or followers 22 and 23 serve to compress gaskets 16 and 21, respectively. The gasket may consist of closed rings of rubber or of any other suitable gasket material. Gasket 16 is confined between end ring 13 and the interior of the cylinder to be tested and between rings 15 and 22. Gasket 21 is confined between ring 14 and the interior of the cylinder to be tested and between removable ring 19 and follower 23. It is an advantage of the construction that the pressure of the testing fluid against each gasket of the apparatus is distributed over a relatively narrow annular area corresponding approximately to the cross-sectional area of the space between the core and the cylinder being tested.

The core is braced against inward collapse by means of a plurality of stiffening rings 24, 25, which are spaced along its interior.

Gland ring 22 has a number of slots through which guide pins 26 extend. These pins and slots permit movement of the gland ring longitudinally of the core and into compression with gasket 16. A plurality of rods 28, 29 are secured at their left ends to gland ring 22, Figs. 1 and 4. These rods extend through the core and pass through holes in brackets 30, 31, which are fixed to the core. The right-hand ends of these rods, Figs. 1, 2 and 5, are engaged by eye-bolts 32, 33, 34 and 35. The eye-bolts are adapted to extend through slots 36 in lugs 37, 38, 39 and 40 which are carried by gland ring 23. The construction is such that when the nuts on the ends of the eye-bolts are loosened or removed, the eye-bolts may be swung from engagement with the lugs to enable the removal of gland ring 23, gasket 21 and removable ring 19.

The apparatus as shown in Fig. 1 is in assembled condition with the cylinder 10 mounted thereon and ready for testing. The pipe 43 extends into the interior of the core and is tapped into its wall at 44, whereby water or other fluid medium may be introduced in the space 45 between the core and the cylinder. Pipe 43 has connected therewith a water supply conduit 46 and a drain 47, with valves by which the water may be flowed into or from pipe 43 and space 45. Pipe 43 is preferably located at the lowest portion of the core so as to enable draining of water or of other fluid from the space around the core. The filling and voiding operations are controlled by valves in conduits 46 and 47.

A pipe 48 is provided for permitting the escape of air from space 45 during a filling operation. This pipe is within the core and has a tapped connection therewith at 49 and an outlet through pipe 50. When the space 45 is entirely filled, valve 51 is closed and the pressure is built up to the desired amount. A gauge 52 provides a means for determining the amount of pressure within the cylinder.

In using the apparatus, the cylinder to be tested is slipped into position and slid along the core until the ends of the cylinder are over the end rings 13 and 14. Ring 15 and removable ring 19 center the cylinder on the core. Gasket 21 is then mounted in place and gland ring 23 is placed into position against the gasket. The eye-bolts are then adjusted and tightened, with the result that the gland rings 22 and 23 exert pressure upon the gaskets which are distended against their enclosing surfaces, including the interior of the cylinder. If water is used it is introduced to the space 45 between the cylinder and the core until the space is filled. Pressure of the confined water is run up to the desired testing pressure. While maintained under this pressure the entire surface of the cylinder may be inspected for leakage.

At the conclusion of a testing operation the water is voided by opening the valve in the drain line. Upon removing the gland ring 23 the cylinder is readily removable from the end of the apparatus. This gland ring or follower is of light construction and can be easily handled. Because of the relatively small volume of water which is needed to make the test, the apparatus can be quickly filled and emptied and the test completed in a relatively short time. If compressed air is used for testing purposes, dangers attending the use of large volumes of compressed air are eliminated.

A modification of the testing apparatus is illustrated in Figs. 6 and 7. This includes a core 53 and a support 54 which are similar in construction to the core and support previously described. The core is internally braced by sets of rings 55 and radial spokes 56. In this apparatus no means is provided for increasing the compression of the gasket at the supported end of the core once the cylinder 57 has been mounted into position. Gasket 57' is mounted between a pair of rings 58 and 59 which, together with the exterior of the core, provide a gasket-receiving groove. The arrangement is such that the groove is of fixed dimensions and sealing is obtained by slipping the end of the cylinder 57 over the gasket.

The unsupported end of core 53 has mounted on its exterior a ring 60 which serves as an abutment for one side of a gasket 61. A follower ring 62 has a male portion projecting inwardly of the core and providing only a slight clearance between itself and the inner wall of the core, whereby the follower ring may be slid longitudinally of the core. The follower is provided with means in the form of a sloping surface 64 which forces the gasket into tight compression against the interior surface of the cylinder 57 and against abutment ring 60, so as to seal the space 65 between the core and the cylinder.

When a cylinder is in position for testing the follower 62 is held in its operating position by a set of eye-bolts 66, 67, 68 and 69. Eye-bolts 66 and 68 are fastened to pins 70 and 71, respectively, which extend between the flanges of a pair of angle irons 72, 73. Similar pairs of angle irons 74 and 75, extending at right angles to the first-mentioned pair, support pins to which eye-bolts 67 and 69 are connected. The angle irons are secured together by a plate 74'. The ends of all of the angle irons are secured to the interior of the core by welding and thus serve as further additional bracing for the core, as well as means for supporting the follower 62. The follower has lugs 76, one for each of the eye-bolts. The eye-bolts may be swung on their pins through slots 77 when the nuts 78 are loosened or removed therefrom. The follower 62 is removable from the end of the core upon disengaging the eye-bolts.

Space 65 between the core and the cylinder may be filled by the introduction of water through conduit 79 and valve 80 which have connection with a water supply (not shown). A conduit connection 81 and a suitable valve means 82 are provided for draining the annular space 65 at the conclusion of a testing operation. Pipe 83, having connection with annular space 65, serves as a vent for permitting the escape of air from the top of that space during a filling operation, and also provides means for connecting space 65 with suitable indicating or recording means for indicating the amount of pressure. If it is desired to use compressed air for testing purposes this may be introduced through conduit 83 and when this is done valves 80 and 82 are maintained closed.

What is claimed is:

1. In apparatus for testing hollow cylinders, the combination comprising a hollow core having an outside diameter less than the inside diameter of a cylinder to be tested, means supporting said core in cantilever fashion from one end of said core, a gasket encircling said core at the supported end thereof, an annular wall extending outwardly from said core and having an outer diameter slightly less than the inner diameter of a cylinder to be tested, said annular wall being located to counter thrust from said gasket, when in compression, in a direction longitudinally of said core, a follower ring for bearing upon the side of said gasket opposite from said annular wall, said gasket being enclosed for compression between said annular wall, follower, the exterior surface of said core, and the interior of a cylinder to be tested, a removable abutment ring mounted exteriorly of said core at its distal end and having an outer diameter slightly less than the inner diameter of a cylinder to be tested, said abutment ring being located for countering thrust from a second gasket, a second gasket encircling the exterior of said core at its distal end and disposed adjacent said removable ring, means cooperating with said core and removable ring for limiting the movement of said removable ring away from said second gasket, a second follower for engaging the side of said second gasket opposite from said removable ring, said second gasket being enclosed for compression between said removable ring, second follower, the exterior surface of said core, and the interior of a cylinder to be tested, adjustable means connecting said first and second followers whereby said followers may be simultaneously displaced to exert pressure on said first and second gaskets to seal the extremities of the annular space between said core and a cylinder mounted thereon by compression of said gaskets within their respective enclosures at the ends of the cylinder, and means for introducing fluid to the annular space between said core and a cylinder.

2. In apparatus for testing hollow cylinders, the combination comprising a hollow core having an outside diameter less than the inside diameter of a cylinder to be tested, means supporting said core from one end, a pair of abutment rings mounted on the outside of said core, one at each end of said core, and defining the longitudinal limits of an annular space between the exterior of said core and a cylinder mounted thereon, the abutment ring at the distal end of said core being removable for facilitating mounting a cylinder over said core, a gasket disposed against the off-side of each of said abutment rings and encircling said core, followers mounted for movement on said core for engaging with said gaskets at either end of said core, means carried by said core for pressing said followers into engagement with said gaskets and whereby each gasket is compressed between its associated abutment ring and follower, the exterior surface of said core and the interior surface of a cylinder to be tested for sealing the ends of an annular space between said core and a cylinder mounted thereon, and means for introducing fluid to the annular space between said core and a cylinder mounted thereon for testing.

3. In apparatus for testing hollow cylinders, the combination comprising a hollow core having an outside diameter less than the inside diameter of a cylinder to be tested, means secured to one end of said core for supporting the same, means forming an annular wall for locating a gasket at the supported end of said core, means forming an annular wall for locating a second gasket at the distal end of said core, said first and second wall-forming means having outside diameters greater than the exterior diameter of said core and slightly less than the interior diameter of a cylinder to be tested whereby an annular space is provided between said core and said cylinder, a pair of gaskets encircling said core, one of said gaskets being located adjacent said first wall-forming means and the other of said gaskets being located adjacent said second wall-forming means, slidable followers mounted at either end of said core, one at the outer side of said first-named wall-forming means and adjacent gasket, and one at the outer side of said second wall-forming means and adjacent gasket, means including tie-rods extending through said hollow core and connecting together said slidable followers, means for adjusting the tension in said rods for exerting pressure on said gaskets whereby said annular space between said core and a cylinder mounted thereon for testing is sealed at its ends by compression of said gaskets, and means for introducing fluid to the annular space between said gaskets and between said core and a cylinder mounted thereon for testing.

4. In apparatus for testing hollow cylinders, the combination comprising, a hollow core having an outside diameter less than the inside diameter of a cylinder to be tested, means supporting said hollow core from one end, a deformable gasket encircling said hollow core at its supported end, means locating said gasket and forming a groove over the surface of said hollow core for containing said gasket, a second gasket abutting the distal end of said hollow core, a follower ring supported at the distal end of said hollow core and having a radial flange extending beyond the inner diameter of a cylinder to be tested, said follower ring having a surface for engaging and compressing said second gasket against the end of said hollow core and the inner surface of a cylinder mounted thereon, adjustable means carried by said hollow core and supporting said follower ring in compressing contact with said second gasket, means within said hollow core for bracing its wall against collapse under pressure exerted by fluid contained in the annular space between said core and a cylinder mounted thereon and between said gaskets, and means for introducing fluid to said annular space.

JAMES EDWARD LONGLEY.